Feb. 23, 1965
J. M. HAUSMAN
3,170,550
VARIABLE SPEED DRIVE WITH BRAKE
Filed Aug. 21, 1962
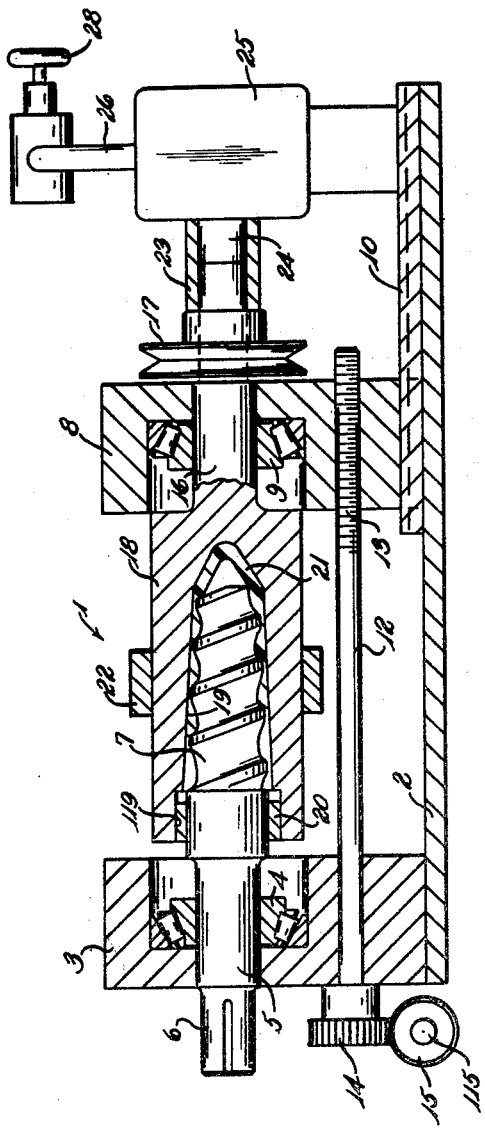
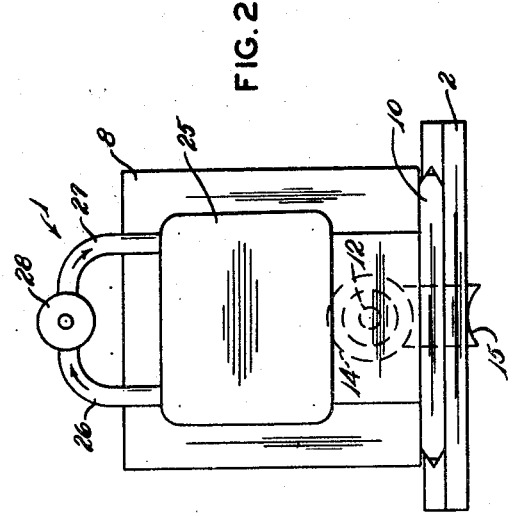
INVENTOR.
JOHN M. HAUSMAN
BY Oldham & Oldham
ATTYS.

_United States Patent Office_

3,170,550
Patented Feb. 23, 1965

3,170,550
VARIABLE SPEED DRIVE WITH BRAKE
John M. Hausman, 2669 Wilbur Road, Rte. 4,
Medina, Ohio
Filed Aug. 21, 1962, Ser. No. 218,259
9 Claims. (Cl. 192—12)

The present invention relates to variable speed drives, and to a compact apparatus adapted to transmit substantial horsepower by readily adjustable variable speed control means.

Heretofore there have been various types of variable speed drives provided. Many of such drive means are relatively large, and many of such drive means are quite costly and/or difficult to maintain in service over long periods of operation. Yet other types of variable speed drive means used heretofore have not provided a large number of speed proportions between the drive and driven shafts, or the drive means may be objectionable for other reasons, such as being extremely large in size, or by requiring replaceable connecting belts therein.

The general object of the present invention is to provide a novel and improved variable speed drive made from a relatively few members of sturdy, but uncomplicated design and being relatively inexpensive to produce, and characterized by the transmission of drive through a flowable plastic material.

Another object of the invention is to provide a variable speed drive wherein a substantially infinite number of speed ratios between the drive and driven means can be obtained by readily controlled means in the apparatus.

Yet another object of the invention is to provide an improved variable speed drive means wherein the connection between the drive and driven shafts is provided by an extrusion screw received in an extruder-type cylinder having a recess for receiving the screw therein and having heat resistant, tough plastic means forming the only connection between the extruder screw and the driven sleeve or cylinder.

Another object of the invention is to provide an adjustable speed drive means having means associated therewith for preventing overrun, or overriding action of the driven sleeve, and to provide a sturdy type of an apparatus that will give a long service life with a minimum of maintenance thereon.

The foregoing and other objects and advantages of the invention will be made more apparent as the specification proceeds.

Attention now is particularly directed to the accompanying drawings, where:

FIG. 1 is an elevational view, partially broken away and shown in vertical section, of a variable speed drive means embodying the principles of the invention; and FIG. 2 is a right side elevation of the apparatus shown in FIG. 1.

When referring to corresponding members shown in the drawings and referred to in the specification, corresponding numerals are used to facilitate comparison therebetween.

The present invention, generally speaking, relates to a variable speed drive apparatus or unit including a driven extruder-type screw, an extruder-type cylinder receiving the screw therein from one end of the cylinder and forming a closed end chamber about the screw and the free end thereof, means journalling the screw and the cylinder in axial alignment, other means operatively engaging the screw and the cylinder for changing the relative axial positions thereof to determine the spacing of the screw in the cylinder, heat resistant plastic material received in the chamber to connect the screw to the cylinder for transmitting drive therebetween, which screw is engageable by a suitable drive means for power input to the apparatus, means engaging the cylinder to rotate therewith and form an output for the apparatus, and other means operatively connecting to the cylinder to prevent overriding of the cylinder with relation to the screw upon reduced input power conditions.

Attention now is particularly directed to the details of the structure shown in the drawings, and a variable speed drive apparatus is indicated as a whole by the numeral 1. This apparatus includes a base plate or frame 2 to which a housing 3 is suitably attached. This housing 3 receives a conventional bearing 4 therein. The bearing 4 is adapted to journal a suitable drive means in the apparatus 1. Such drive means includes a member, such as a drive shaft 5 that has one end portion 6 adapted to have any conventional type of drive means or gearing secured thereto for power input into the apparatus 1. At the opposite end of the drive shaft 5, an extruder-type screw 7 is formed. This screw 7 usually is integral with the drive shaft 5, and the screw 7 may be of any desired construction but usually tapers slightly radially inwardly when approaching the free end of the screw 7. The bearing means 4 positions the screw 7, as a cantilever.

The driven portion of the apparatus 1 includes a member, such as a housing or bracket 8, which positions a bearing 9 therein. This housing 8 is suitably attached to the base plate or frame 2 by means, such as a plate 10, that has any suitable type of a dovetail and groove or similar connection provided between the base portion of the housing 8 and the plate 10 to engage such members for relative movement of the housing 8 along the axis of this plate 10 (and of the frame 2).

The actual position of the housing 8 with relation to the housing 3 in the frame of the apparatus is controlled by a member, such as a shaft 12, that has a threaded end 13 engaging a tapped bore provided in the housing 8. The shaft 12 is journalled in the housing 3 and is secured to a control member, such as a gear 14, that engages a worm 15 on a shaft 115 whereby rotation of the worm 15 will adjust the position of the housing 8 axially with relation to the housing 3 for control of the drive ratio of the variable speed drive apparatus of the invention, as hereinafter explained in more detail.

The housing 8 positions a member, such as a driven shaft 16, in the bearing 9, and a suitable output member, such as a gear or pulley 17, can be secured to this driven shaft 16 to form the output means of the apparatus for withdrawing drive therefrom.

It is an important feature of the present invention that the driven shaft 16 includes as an integral portion thereof, or else has operatively secured thereto, an extruder-type cylinder 18 which is positioned as a cantilever extending towards the screw 7. This cylinder 18 is in axial alignment with the screw 7 and such cylinder has a tapered recess 19 extending thereinto from the end thereof adjacent the screw 7. The opposite end of the cylinder 18 is closed, and the cylinder 18 usually conforms closely to the external shape of the screw 7 and forms an enclosed compartment therearound by conventional means, such as by a bearing or bushing 20 as carried by a part of the screw 7 and engages the recess 19 at a counterbore 119 at its open or free end.

A further important feature of the present invention is that a heat resistant, high shear type of a plastic material 21, such as silicone or a compound of silicone is received within the chamber formed intermediate the screw 7 and the walls of the recess 19. Such plastic material thereby forms the only connecting means between the drive shaft 5 and the driven shaft 16 whereby the characteristics of such plastic material will determine the drive ratio existing between these members, to a certain extent, with the primary control of drive being effected by means of the axial spacing of the housing 3 from the housing 8, which action controls the radial spacing of the screw 7 from the confining portions of the walls of the recess 19 to vary the size of the chamber in which the plastic is received. It will be realized that any suitable plastic material can be used in this recess 19, but that silicones, for example, are a typical high shear, heat resistant material that could give a long service life in the apparatus of the invention.

It may be necessary in some instances to provide some type of a cooling jacket associated with and carried by the cylinder 18 on the periphery thereof or built thereinto whereby the formation of excessive heat within the cylinder 18 and of the plastic material 21 is avoided to maintain its characteristics substantially uniform in use.

FIG. 1 of the drawings indicates that an output member 22 may be secured to the periphery of the cylinder 18, if desired, so that in some instances the shaft 16 does not need to extend past the housing 8 for withdrawal of drive from the apparatus of the invention.

In many instances it is desirable to prevent any overriding of the driven shaft 16 with relation to the drive shaft 5 when any change, or sharp reduction in the speed of the drive shaft 5 is made. In order to achieve this end, usually some type of a sleeve 23 connects an end of the driven shaft 16 to the drive shaft 24 of a conventional hydraulic pump 25. This hydraulic pump is shown as having an output conduit 26 and an input conduit 27. These conduits 26 and 27 are connected by means of an adjustable valve 28. Hence at any time when the driven shaft 16 is being rotated, the pump 25 is likewise being driven to provide resistance to rotation of the drive shaft 16 and with such resistance being regulated by the opening provided in the adjustable valve 28. This valve can be adjusted to any desired rate of flow between the input and output conduits to aid in providing resistance to rotation of the shaft 16.

From the foregoing, it will be seen that a closed cylinder or chamber has been formed around the screw 7 and that the clearances provided in this cylinder by the recess or cavity 19 therein can be varied accurately by use of the worm and gear 14 and 15. The seal of such chamber by the bushing 20 preferably is airtight, or it may pass air thereby, as desired. Usually the plastic 21 doesn't completely fill the space between the screw 7 and the cylinder 18.

The apparatus of the invention is quite sturdy and can transmit relatively large amounts of power efficiently and continuously without severe strain or damage to the variable speed drive and without excessive heat loss. It will be noted that substantially infinite speed ratios can be obtained by small increments of adjustment of movement axially of the cylinder 18. The total amount of movement of such cylinder can be limited to a short distance, such as about ½ to 1 inch, and different volumes of plastic material might even be forced into the recess or cavity 19 prior to the positioning of the screw 7 therein, dependent upon the percentages of drive desired to be transmitted between the drive shaft or screw 7 and the driven shaft 16. This apparatus is sturdy and is relatively inexpensive to make but yet will give an excellent, adjustable, variable speed apparatus useful under a variety of operative conditions. Thus it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What I claim is:

1. A variable speed drive apparatus comprising
   a driven extruder-type screw,
   a cylinder receiving said screw therein from one end thereof,
   means forming a closed end chamber with said cylinder about said screw,
   a pair of spaced means journalling said screw and said cylinder in axial alignment and positioning them in telescoped cantilever relation,
   means operatively engaging said screw and said cylinder for changing the relative axial positions thereof,
   a heat resistant tough high shear plastic material received in said chamber to connect said screw to said cylinder,
   said screw being driven to transmit drive to said cylinder,
   means engaging said cylinder to rotate therewith and form an output for the apparatus, and
   means operatively connecting to said cylinder to prevent overriding of said cylinder with relation to said screw.

2. A variable speed drive apparatus comprising
   a driven screw means,
   a cylinder receiving said screw means therein from one end thereof,
   means forming a closed end chamber with said cylinder about said screw means,
   a pair of spaced means journalling said screw means and said cylinder in axial alignment and positioning them in telescoped cantilever relation,
   means operatively engaging said screw means and said cylinder for changing the relative axial positions thereof to change the size of said chamber,
   a heat resistant, tough plastic material received in said chamber to connect said screw means to said cylinder,
   said screw means being driven to transmit drive to said cylinder, and
   means engaging said cylinder to rotate therewith and form an output for the apparatus.

3. A variable speed drive apparatus comprising
   an extruder screw,
   a cylinder receiving said screw therein from one end thereof and forming a closed end chamber about said screw,
   means engaging and journalling said screw and said cylinder to position them in axial alignment,
   means operatively engaging said screw and said cylinder for changing and controlling the relative axial positions thereof,
   a tough plastic material received in said chamber to connect said screw to said cylinder,
   said screw being driven to transmit drive to said cylinder,
   a hydraulic pump connected to said cylinder to be driven by rotation thereof, and
   adjustable valve and conduit means connecting the output of said pump to the input thereof to prevent overriding of said cylinder with relation to said screw.

4. A variable speed drive apparatus comprising
   a driven extruder screw,
   a cylinder receiving said screw therein from one end thereof and forming a closed end chamber about said screw,
   means engaging and journalling said screw and said cylinder to position them in axial alignment for rotation thereof,
   means adjustably and operatively engaging said screw and said cylinder for changing the relative axial positions thereof,
   a plastic material received in said chamber to connect said screw to said cylinder to transmit drive therebetween, and
   means connected to said cylinder for rotation therewith to provide a drive output for the apparatus.

5. A variable speed drive apparatus comprising
   a frame, a bearing means operatively secured to said frame,
a drive shaft journalled in said bearing means,
an extruder screw secured to said drive shaft,
a second bearing means,
means securing said second bearing means to said frame for movement axially of said drive shaft,
a driven shaft journalled in said second bearing means in axial alignment with said drive shaft,
said driven shaft including a cylinder having a recess extending thereinto in an axial direction at one end thereof and having one closed end,
said cylinder receiving said extruder screw in said recess and being sealed at its end receiving said screw, and
a heat-resistant plastic means received between said cylinder and said screw to transmit drive to said driven shaft from said drive shaft whereby the percentage of drive transmitted is controlled by the spacing of said cylinder and said screw.

6. A variable speed drive apparatus comprising
a base plate,
a bearing means operatively secured to said base plate,
a drive shaft journaled in said bearing means,
an extruder screw secured to said drive shaft,
a second bearing means,
means securing said second bearing means to said base plate for movement axially of said drive shaft,
means operatively engaging said second bearing means to move it axially of said drive shaft and control its position relative to said drive shaft,
a driven shaft journalled in said second bearing means in axial alignment with said drive shaft,
a cylinder having a tapered recess extending thereinto in an axial direction at one end thereof and having one closed end,
said cylinder being operatively secured to said driven shaft and receiving said extruder screw in said recess,
means sealing said cylinder about said extruder screw, and
a high shear type plastic means received between said cylinder and said screw to transmit drive to said cylinder and driven shaft from said drive shaft whereby the percentage of drive transmitted is a function of the spacing of said cylinder and said screw.

7. A variable speed drive apparatus comprising
a frame,
a bearing means operatively secured to said frame,
a drive shaft journalled in said bearing means,
a screw means operatively secured to said drive shaft,
a second bearing means,
means securing said second bearing means to said frame for moving it axially of said drive shaft to control its position relative to said drive shaft,
a driven shaft journalled in said second bearing means in axial alignment with said drive shaft,
a cylinder having a cavity extending thereinto in an axial direction at one end thereof and having one closed end,
said cylinder being operatively secured to said driven shaft and receiving said screw means in said cavity, and
a heat resistant plastic means received between said cylinder and said screw means to transmit drive to said cylinder and driven shaft from said drive shaft whereby the percentage of drive transmitted is a function of the spacing of said cylinder and said screw means.

8. A variable speed drive apparatus comprising
a frame,
a bearing means operatively secured to said frame,
a drive shaft journalled in said bearing means,
a screw member operatively connected to said drive shaft, said screw member having a freely positioned end and being of reduced diameter at said end,
a second bearing means,
means securing said second bearing means to said base plate,
means operatively engaging one of said bearing means to position it for movement parallel to the axis of said screw member,
a driven member journalled in and positioned by said second bearing means in axial alignment with said drive shaft,
said driven member including a cylinder having a tapered recess extending thereinto in an axial direction at one end thereof and having one closed end,
said cylinder receiving said screw member in said recess,
means sealing said cylinder about said screw member, and
a high shear type plastic means received between said cylinder and said screw member to transmit drive to said driven member from said drive shaft whereby the percentage of drive transmitted is a function of the spacing of said cylinder and said screw member.

9. A variable speed drive apparatus comprising
a frame,
a bearing means operatively secured to said frame,
a drive shaft journalled in said bearing means,
an extruder screw member operatively secured to said drive shaft,
a second bearing means,
means securing said second bearing means to said frame,
a driven shaft member journalled in said second bearing means in axial alignment with said extruder screw member,
said driven shaft member cylinder having a recess extending thereinto in an axial direction at one end thereof and having one closed end, said recess being complementary in shape to said screw member,
said cylinder receiving said extruder screw member in said recess and being sealed at its end receiving said screw member,
means operatively engaging one of said members to enable it to be moved axially relative to the other to vary the clearance of said extruder screw member in said cylinder recess, and
a heat-resistant plastic means received between said cylinder and said screw member to transmit drive to said driven shaft member from said drive shaft member whereby the percentage of drive transmitted is controlled by the spacing of said screw member from the walls of said cylinder recess.

References Cited by the Examiner
UNITED STATES PATENTS

| | | |
|---|---|---|
| 2,052,132 | 8/36 | Cobb et al. |
| 2,484,913 | 10/49 | Snell. |
| 2,615,303 | 10/52 | Putt. |

FOREIGN PATENTS

| | | |
|---|---|---|
| 190,248 | 12/22 | Great Britain. |
| 328,093 | 4/30 | Great Britain. |
| 680,851 | 10/52 | Great Britain. |

OTHER REFERENCES
Product Engineering, October 1953, pages 142–143.

DAVID J. WILLIAMOWSKY, *Primary Examiner.*